June 2, 1936.  E. B. NEVIN  2,043,057
MOTOR VEHICLE
Filed Sept. 20, 1935  2 Sheets-Sheet 1
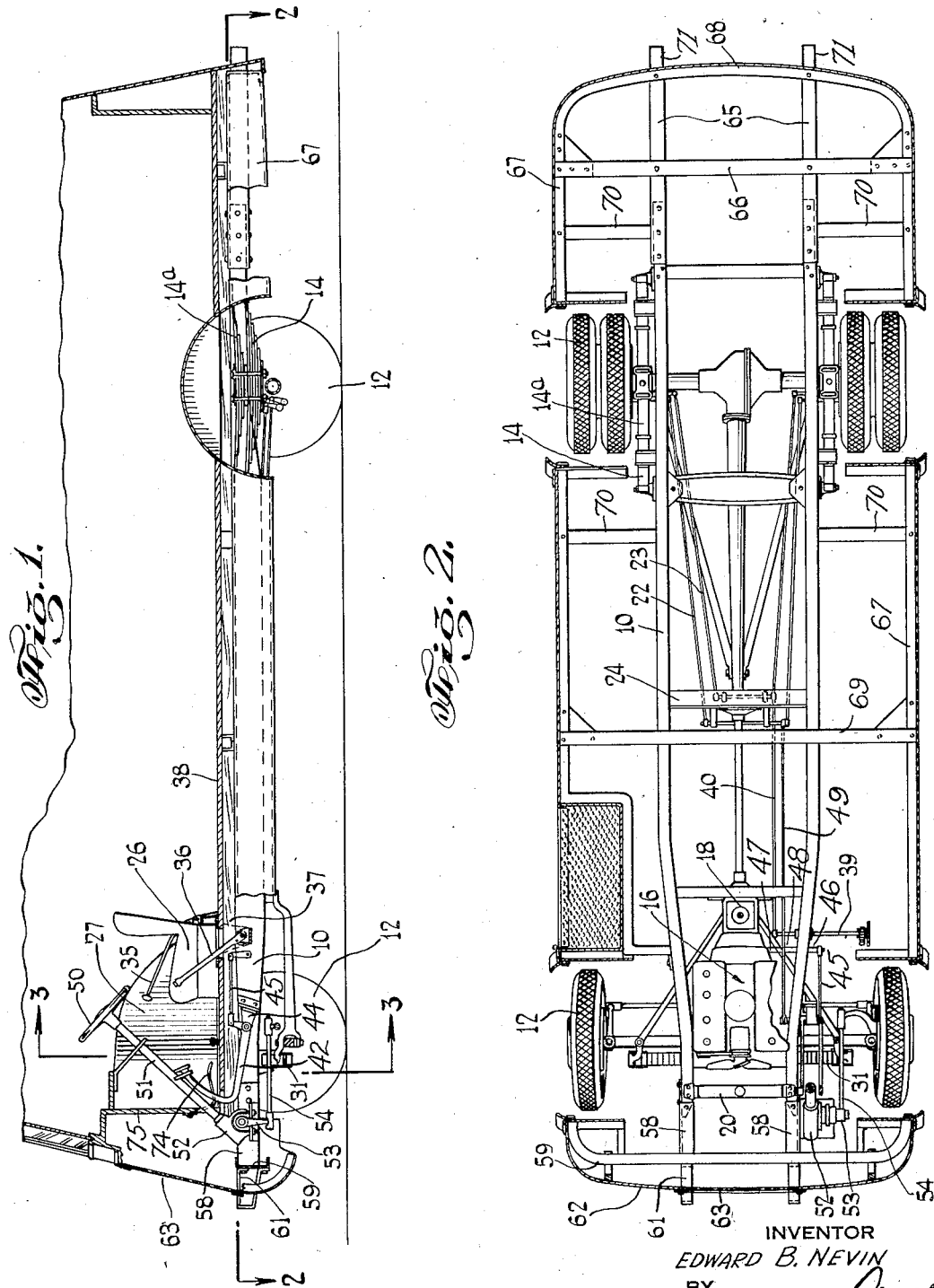
INVENTOR
EDWARD B. NEVIN
BY
Hammond & Hill
ATTORNEYS June 2, 1936.                E. B. NEVIN                2,043,057
                            MOTOR VEHICLE
                    Filed Sept. 20, 1935        2 Sheets-Sheet 2
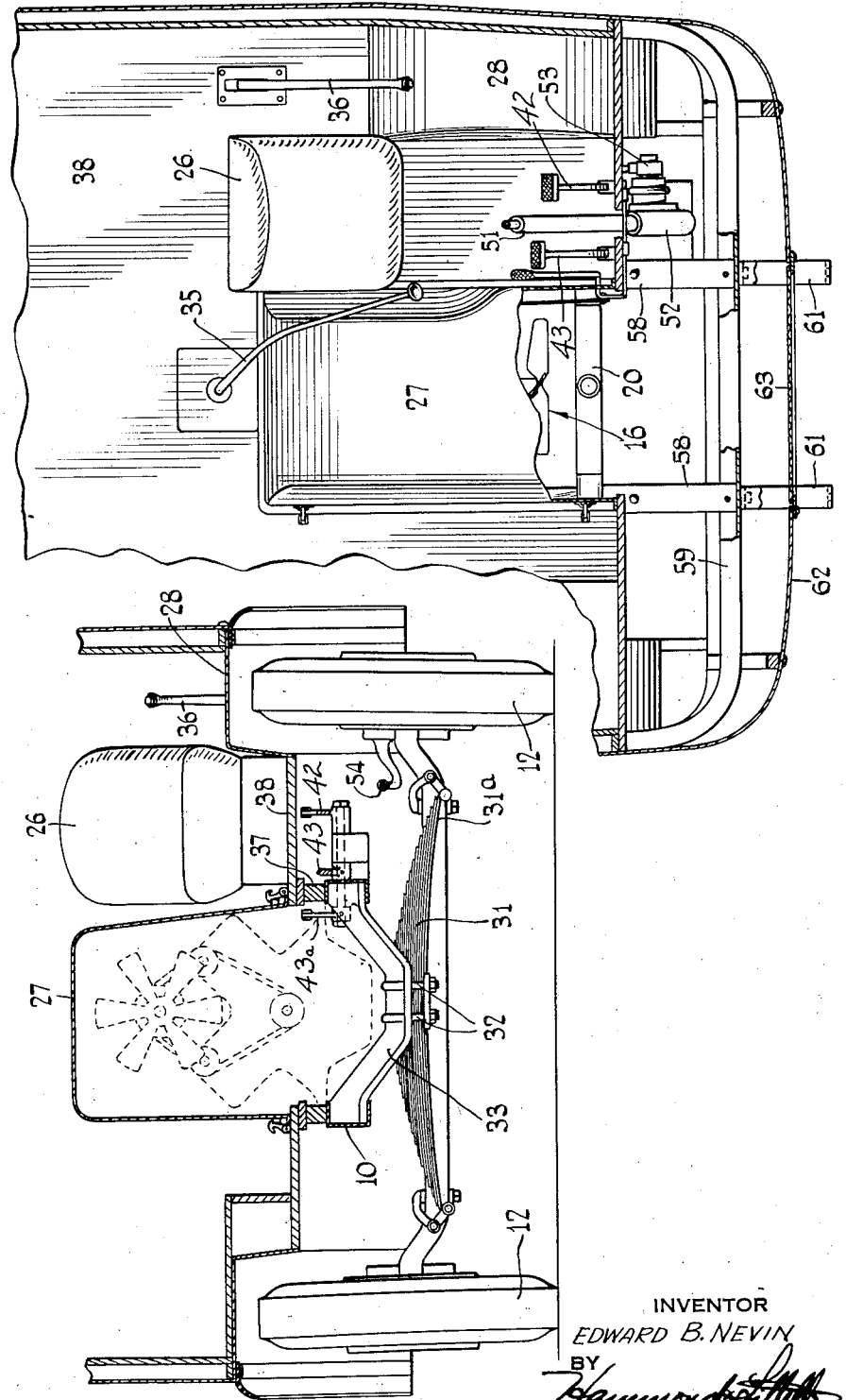
INVENTOR
EDWARD B. NEVIN
BY
ATTORNEYS Patented June 2, 1936

2,043,057

UNITED STATES PATENT OFFICE 2,043,057

MOTOR VEHICLE

Edward B. Nevin, New York, N. Y., assignor to Nelson Littell, New Canaan, Conn.

Application September 20, 1935, Serial No. 41,429

6 Claims. (Cl. 180—54)

This invention relates to improvements in motor vehicles and more particularly to apparatus for converting standard, low-price, high-production, type truck chassis for bus or truck use so that the payload capacity may be greater than is otherwise available.

Truck chassis generally available for large capacity buses and other cargo carriers have usually been of the heavy duty type with the heavy engine, and custom made chassis thought necessary to withstand the severe demands. Such chassis are made in relatively small quantities however and at a great initial cost. The operating expense is also great and in competitive activities such as bus transportation and short haul cargo delivery, these costs are often prohibitory. Attempts have therefore been made to use the small, light truck chassis, particularly the low-price production type such as Chevrolet and Ford, which are rather short in length but very economical and inexpensive, and they have relatively high powered engines. The conversion of such truck chassis for sufficient capacity has included either increasing the wheelbase with a resultant destruction of the foundation of the chassis or increasing the overhang to a point at which the truck was either overbalanced or unmanageable or elevating the driver's seat to a position above the engine and such conversions have been generally found unsatisfactory.

The principal object of my invention is to take advantage of the low-cost, high-economy truck chassis and without any modification of the wheel base, to convert it into a greater cargo carrying chassis which is easier to operate, with no excessive overhang and to so arrange the parts that the chassis is adaptable for bus, utility or cargo transportation.

A further object of my invention is to convert a standard type of high-production, low-cost truck chassis for use as a bus chassis or cargo carrier in which I materially increase the capacity and length of the payload area by moving the driver and his controls forward to a position alongside the engine rather than to the rear thereof.

Another object of my invention is to provide improved control and stability of low-price, high-production type chassis by conversion of the chassis without modification of the wheelbase, such conversion including increasing the front tread to substantially equal the maximum rear tread when the vehicle is operated under heavy duty conditions, and to so arrange the payload area that a greater proportion of the load can be placed on the front axle.

A still further object of my invention is to provide conversion equipment for converting a low-priced, high-production truck chassis into a heavy duty, large capacity vehicle with the operating characteristics and advantages of the low-priced type including ease and economy of replacements such conversion including extending the front frame members for supporting the steering column in a position forward of the front axle and moving forward the other controls and driver's seat to a position alongside the engine and substantially on the previous level of the driver's seat such conversion not affecting the original wheelbase and using substantially all of the original control elements.

A detailed object of my invention is to convert a Ford V-8 truck chassis for bus bodies of relatively large seating capacity by increasing the payload area and moving the payload center forward a substantial amount by placing the driver alongside of the engine and between the wheel housing and engine, the front axle being extended to increase the tread and further increase the stability of the frame, the front and rear overhang being extended only for streamlining and a supplemental frame being provided for standard bus body widths.

Further objects and advantages of my invention will appear from the following description thereof when taken in connection with the attached drawings illustrative of a preferred form of embodiment to which my invention is adaptable and in which Figure 1 is a partial vertical section of a converted chassis showing the controls.

Figure 2 is a horizontal section view of the converted chassis shown in Figure 1, and taken substantially along the line 2—2 thereof.

Figure 3 is a vertical section taken substantially along the line 3—3 of Figure 1.

Figure 4 is a horizontal sectional view of the forward quarter of the converted chassis and more particularly showing the driver's controls and related parts.

The preferred form of embodiment of my invention is illustrated in connection with the conversion of a present day standard "Ford V-8" truck chassis and although I refer particularly to this type of chassis it will be clearly understood that similar results can be obtained by equivalent changes to other standard, low-cost, high-production chassis. I particularly distinguish from the large factory built truck chassis however because of the high initial and operating costs which I entirely eliminate by using this particular class of low-priced chassis which can be converted with relatively inexpensive changes. The advantage of modification rather than initially building the chassis to fit as has been practiced in the past is that I avoid the piece-work labor and material costs for substantially the entire chassis and I benefit in having the low production costs of repairs and upkeep of the engines and other parts in these low-cost chassis which are produced by the millions rather than in the small units. By my conversion I find that I can cut initial costs by about one-half and operating costs to about one-third of those now established by economical operation of the heavy duty type trucks.

I also distinguish my modifications and conversion of these low-priced, economical chassis such as the "Ford V-8" from prior attempts to increase body capacity by lengthening the chassis in that I make no alterations of the frame between the wheel centers. The wheelbase and all driving, control and supporting sections within the wheelbase are retained and I am therefore able to comply with all statutory requirements which prohibit mere lengthening of the wheelbase with the usual weakening of the parts. I also avoid any difficulties in control and power supply by maintaining the originally carefully engineered arrangement of parts.

In specific consideration of one manner in which I may satisfactorily accomplish my desired objective, I have illustrated a Ford truck chassis which is especially suitable for a bus and as shown in Figures 1 and 2 the chassis 10 is mounted on suitable wheels 12, the rear ones of which are provided with springs 14 and helper springs 14a as is well known construction. For heavy duty work, dual rear wheels are preferred and they are driven in the customary manner from the motor 16 through the transmission 18 and the other related parts. The motor 16 is cooled by radiator 20 and the truck is provided with suitable brakes mounted adjacent the rear wheels and operated by brake rods 22 and 23, such rods ending in levers and other linkages on the intermediate cross member 24 between the longitudinal channels of the chassis frame. These parts are all standard and are shown in their respective positions as on the "Ford V-8" chassis.

The principal change that I find especially desirable to obtain the desired increase of payload area is to place the driver in a position alongside of rather than to the rear of the engine 16. As shown, the driver's seat 26 is preferably placed forward of the engine transmission 18 and as shown in Figure 3, I have materially increased the front tread so that the driver may conveniently be located between the motor hood 27 and the wheel housing 28. The tread increase is accomplished by supplying a longer and heavier spring 31 and I find it most economical and satisfactory to use the usual spring and add several longer spring leaves 31a at the bottom so that the resultant spring is both longer and heavier. The spring shackles 32 which fasten the spring to the usual front cross channel 33 of the frame are of course new and longer but the usual spring mounting parts are used.

With the driver located forward of the transmission the various controls must be rearranged but I find that certain changes can be accomplished with the least expense and with greatest convenience. The gear shift lever 35 is modified from the usual one provided but it is somewhat longer and forwardly bent rather than as usual so that without other linkage, the gear shifting can be readily accomplished. No changes are therefore necessary to the usual transmission 18.

The hand brake lever 36 also can be used although it is mounted on the left side of the driver and on a suitable bearing support 37, which as shown in Figure 1 is secured to the floor 38 of the chassis body. I connect it to the usual brake rods 23 by extending the brake shaft 39 through the usual chassis frame and thence, by link 40, to the operating linkage for brake rods 23. In this respect, the link 40 is secured on the side of the frame center line opposite to the original operating link and no new installation of the principal rods 23 is required.

The clutch and foot brake pedals 42 and 43 are mounted on a newly located bearing 44 which as shown in Figure 1 is mounted on the chassis frame. The clutch pedal 42 is of a bell crank type and it is connected through link 45 to an extension 46 of the usual clutch shaft 47. A sleeve 48 allows for this extension and makes it possible to use all of the original clutch shifter parts although the extended shaft projects through the frame of the chassis.

The foot brake pedal 43 also has a bell crank portion 43a shown in Figure 3 to which is secured the link 49 which in turn is connected to the usual foot brake rods 22. It is of course to be understood that the mechanical foot brake is the least expensive and generally satisfactory arrangement but of course power brakes may be used and with especially heavy traffic conditions, these may be preferred. Such equipment is standard accessory equipment however and need not be shown.

The steering apparatus is preferably moved forward approximately as far in front of the front axle as it formerly was behind the axle. The steering wheel 50 surmounts the steering column 51 which operates the usual gear mechanism at the supporting base 52, which supporting base is mounted on the frame extension arm 58. The projecting lever or crank 53 extends below the support and is secured to drag link 54 in the usual well known manner. The original link can be used with a further saving in converting costs.

The carburetor controls may be arranged for the convenience of the driver and the accelerator pedal 74 is mounted on the new body dashboard 75. Starter connections and indicators can of course be mounted in any desired location at the convenience of the driver.

The frame of the standard Ford chassis is extended somewhat in front to carry the steering column in its new position by securing short channel extensions 58 to the longitudinal channels and while I prefer to bolt and weld these extensions together, any suitable securing means may be used. As a rule no load need be carried on these extensions but I prefer to have a transverse channel section 59 for reinforcing the front end and, being spaced in advance of the engine and radiator, it protects the vital parts. This channel is preferably not intended to be used as the bumper but to support bumper brackets 61 and it may carry the front panel 62 of the body and the grille 63 so that a streamlined effect can be obtained. This front projection is not greatly in front of the front axle however and does not materially add to the front overhang.

The rear of the chassis beyond the rear wheels is also extended somewhat both for added load balance and extra rigidity. As shown in Figures 1 and 2 the rear extension channels 65 are secured to the chassis frame such as by bolting and welding and are joined by a transverse channel 66 which extends beyond the limits of the extreme tread of the dual rear wheels 12. I also find that for supporting wide bus bodies as well as large cargo bodies, it is desirable to use a supplemental frame element including the side rails 67 and the rear rail 68, and the transverse channel 66 helps to brace this supplemental frame. Other transverse channels 69 may be used if desired, and shorter partially transverse reinforcing members 70 are usually desirable. The rear bumper brackets 71 are preferably not extensions of the frame.

It will be noted that extensions of the rear portion of the chassis add directly to the load carrying length and as I move the front edge of the load carrying space forward almost three feet on the standard 157 inch chassis, I can obtain the same balance of load by adding three feet more on the rear. As a rule however, this makes too great an overhang. Furthermore, I find it more satisfactory to increase the front axle loading for better balance and roadability as well as for greater gross loadings as provided for by maximum axle loadings and by placing the payload center forward this can be accomplished. Streamlined effects can also be very satisfactorily obtained on this rear frame extension if desired. The heavier front spring and the helper rear springs are suitable for much greater loads.

The opening for the grille 63 in the body of my busses or trucks is of course of a suitable size to permit free working on the engine when necessary and almost all of the engine can be exposed by removing the hood 27. In case of a major overhaul, the entire engine 16 may be removed by removing the grille 63 and loosening the supports, after which it may be drawn forward. With extremely low established prices on replacement motors, I find it convenient and desirable to supply a complete new motor when substantial repairs may be required rather than make the repairs and this is one of the economical reasons for the use of this type chassis.

The exact nature of the body or its floor plan is not indicated as it is of course possible to mount many different varieties of utility, cargo, or bus type bodies. As a bus I find that I can easily carry twenty-three passengers in a standard form of seating plan by using the standard 157-inch Ford wheelbase. The floor has an unusually large flat area, broken only by the wheel housings which do not project very high although the wheel clearance is as large as necessary. It is of course to be understood that with truck bodies I could provide a cab for the driver and use the remaining portion of the chassis either as a tractor unit or as payload area. The driver's seat is mounted directly on the floor so that he is not in an elevated position but in fact sits at an elevation below parts of the engine. In this forward position, vision is unusually good and he is out of the way of the passengers or cargo. On the opposite side of the engine, the equivalent space may be used for baggage on a bus or for other purposes as desired.

While I have shown and described a preferred form of embodiment of my invention, I am aware that many modifications may be made thereto and I therefore desire broad protection of my invention within the scope and spirit of the description herein and of the claims appended hereinafter.

What I claim is:

1. The method of increasing the payload area of a standard low-priced truck chassis provided with dual rear wheels which comprises the steps of increasing the front wheel tread to substantially equivalent to the maximum tread of the rear wheels, whereby to provide additional space between the engine and the front wheels, adding an extension to the frame forward of the front axle, moving the steering column forward to a position approximately as far in front of the front axle as it normally is in the rear thereof, and supporting it on said extension, moving the remaining controls to a forward position adjacent the engine and forward of the transmission, and providing a driver's seat adjacent the engine and forward of the transmission whereby the space behind the transmission and equal in width to the maximum tread of the rear wheels is available for payload.

2. The method of converting a standard low-priced truck chassis to increase the cargo space without variation of the wheel base, and to increase the proportionate load on the front wheels for greater uniformity of axle loading which comprises increasing the front wheel tread to substantially equivalent to the maximum tread of the rear wheels so that the driver may be accommodated between a front wheel and the engine, providing a forward extension on the frame, moving the steering column forward to a position in front of the front axle and supporting it on said frame extension, and moving the controls for the brakes and clutch to a position substantially forward of the usual position so that the driver may sit forward of the engine transmission and conveniently operate said controls.

3. A standard low-priced chassis conversion adapted to receive a bus body which comprises, in addition to the standard chassis construction embodying dual rear wheels, means increasing the front tread to an extent substantially equal to the maximum tread of the rear wheels, means mounted on the frame between the motor and wheel mounting for accommodating a driver, means to control the vehicle including foot brake and clutch pedals, means supporting the last recited means on the frame alongside the engine, means extending the front frame forward of its usual position, steering means, and means to support the steering means on the frame extending means whereby the space behind the transmission and equal in width to the maximum tread of the rear wheels is available for payload.

4. As a new article of manufacture, a standard low-priced truck chassis conversion including means increasing the front wheel tread to that substantially equivalent to the maximum rear wheel tread including an elongated front axle, chassis extension means extending the length of the frame forward of the front axle, a steering mounting means on said extension means, vehicle control members, means to support said control members forward of standard position, and a driver's seat alongside of the engine and entirely forward of the transmission housing, whereby the space behind the transmission and equal in width to the maximum tread of the rear wheels is available for payload.

5. A conversion of a standard truck chassis having an engine, a transmission to the rear of the engine, and standard control elements including brakes and steering mechanism which comprises a lengthened front axle, a mounting for the steering mechanism forward of the front axle, means supporting the foot pedal controls on the chassis frame in a relatively forward position, modified standard control element linkage extending to the newly located controls and a driver's seat forward of the engine transmission and located in the space provided between the engine and one of the front wheels whereby the chassis is converted to a larger payload capacity without affecting the wheel base.

6. As a new article of manufacture, a standard low-priced truck chassis conversion comprising means increasing the front wheel tread to substantially equivalent to the maximum rear wheel tread including an elongated front axle, chassis extension means increasing the length of the frame forward of the front axle, a steering mounting means on said extension means, vehicle control members, means to support said control members forward of standard position, chassis extension means secured to the rear of the frame, and a bus body overlying and supported on the frame and chassis extension means including a driver's seat alongside of the engine and entirely forward of the transmission housing, whereby the space behind the transmission and equal in width to the maximum tread of the rear wheels is available for payload.

EDWARD B. NEVIN.